(12) United States Patent
Jebailey

(10) Patent No.: US 12,530,939 B2
(45) Date of Patent: Jan. 20, 2026

(54) MAGNET PRINTING DEVICE AND RELATED METHODS

(71) Applicant: Richard John Jebailey, Kissimmee, FL (US)

(72) Inventor: Richard John Jebailey, Kissimmee, FL (US)

( * ) Notice: Subject to any disclaimer, the term of this patent is extended or adjusted under 35 U.S.C. 154(b) by 0 days.

(21) Appl. No.: 19/267,004

(22) Filed: Jul. 11, 2025

(65) Prior Publication Data
US 2026/0018013 A1 Jan. 15, 2026

Related U.S. Application Data

(60) Provisional application No. 63/670,329, filed on Jul. 12, 2024.

(51) Int. Cl.
*G07F 17/26* (2006.01)
*G06Q 20/18* (2012.01)
*G06Q 20/20* (2012.01)
*G07F 11/00* (2006.01)

(52) U.S. Cl.
CPC .............. *G07F 17/26* (2013.01); *G06Q 20/18* (2013.01); *G06Q 20/20* (2013.01); *G07F 11/005* (2013.01)

(58) Field of Classification Search
CPC ......... G07F 11/70; G07F 17/26; G06Q 20/18; G06Q 20/20
USPC ................................................ 700/231, 233
See application file for complete search history.

(56) References Cited

U.S. PATENT DOCUMENTS

| | | | | |
|---|---|---|---|---|
| 5,994,990 | A * | 11/1999 | Ogikubo | B41M 5/508 335/302 |
| 9,666,014 | B2 | 5/2017 | Tyson | |
| 2009/0211533 | A1* | 8/2009 | Sprung | B24D 15/00 51/297 |
| 2020/0382653 | A1* | 12/2020 | Kline | H04N 1/00143 |

FOREIGN PATENT DOCUMENTS

| | | |
|---|---|---|
| EP | 3 656 711 | 8/2021 |
| GR | 2003097 Y | 4/2017 |

OTHER PUBLICATIONS

Wu et al. "3D printing for Marketing and Advertisement Industry" Proc. of the Intl. Conf. on Progress in Additive Manufacturing; 2014; pp. 6.

* cited by examiner

*Primary Examiner* — Timothy R Waggoner
(74) *Attorney, Agent, or Firm* — Allen, Dyer, Doppelt + Gilchrist, PA

(57) ABSTRACT

A magnet printing device includes a kiosk form factor housing, a touchscreen display carried externally by the kiosk form factor housing and configured to receive user input from a user, and a card supply carried internally by the kiosk form factor housing. Each card has a polymer plastic substrate having a first printable major surface, and a second major surface opposite to the first printable major surface, an adhesive layer on the second major surface, and a magnet layer on the adhesive layer. The magnet printing device also includes a printing device carried internally by the kiosk form factor housing. A processor is configured to cause the card supply to pay out a given card to the printing device, cause the printing device to print a custom image on the first printable major surface, and dispense a customized magnet card to the user.

9 Claims, 14 Drawing Sheets

MAGNET PRINTING DEVICE AND RELATED METHODS

RELATED APPLICATION

This application is based upon prior filed Application No. 63/670,329 filed Jul. 12, 2024, the entire subject matter of which is incorporated herein by reference in its entirety.

TECHNICAL FIELD

The present disclosure relates to the field of printing, and, more particularly, to a printing device of magnets and related methods.

BACKGROUND

Kiosk style vending machines are quite common in the modern commercial landscape. With the commoditization of micro computers and thin panel displays, kiosk style vending machines have become smaller, more robust, and increasingly popular for many vending applications. These kiosk style vending machines are typically used for vending transit/payment card applications and self-checkout applications, for example.

SUMMARY

Generally, a magnet printing device comprises a kiosk form factor housing, a touchscreen display carried externally by the kiosk form factor housing and configured to receive user input from a user, and a card supply carried internally by the kiosk form factor housing. The card supply comprises a plurality of cards. Each card comprises a polymer plastic substrate having a first printable major surface, and a second major surface opposite to the first printable major surface, an adhesive layer on the second major surface, and a magnet layer on the adhesive layer. The magnet printing device also includes a printing device carried internally by the kiosk form factor housing, and a processor and memory cooperating therewith. The processor and memory are carried internally by the kiosk form factor housing and coupled to the touchscreen display, the card supply, and the printing device. The processor is configured to cause the card supply to pay out a given card to the printing device, cause the printing device to print a custom image on the first printable major surface of the given card based upon at least the user input, and dispense a customized magnet card to the user.

In some embodiments, the magnet printing device may also include an image sensor device carried externally by the kiosk form factor housing and configured to generate image data. The processor may be coupled to the image sensor device and may be configured to cause the printing device to print the custom image on the first printable major surface of the given card based upon at least the user input and the image data.

Additionally, each card may comprise a coating layer on the magnet layer. The coating layer may comprise an epoxy coating layer. The magnet printing device may comprise a point-of-sale (POS) device carried externally by the kiosk form factor housing and coupled to the processor. The processor may be configured to receive payment from the user via the POS device. The magnet printing device may further comprise a wireless transceiver carried by the kiosk form factor housing and coupled to the processor. The processor may be configured to connect to an external network via the wireless transceiver.

For example, the magnet layer may have a thickness less than 13 mils. The polymer plastic substrate may comprise a polyvinyl chloride (PVC) substrate. The polymer plastic substrate may comprise a CR80 format card substrate.

Another aspect is directed to a method for operating a magnet printing device. The magnet printing device comprises a kiosk form factor housing, a touchscreen display carried externally by the kiosk form factor housing, and a card supply carried internally by the kiosk form factor housing. The card supply comprises a plurality of cards. Each card comprises a polymer plastic substrate having a first printable major surface, and a second major surface opposite to the first printable major surface, an adhesive layer on the second major surface, and a magnet layer on the adhesive layer. The magnet printing device also includes a printing device carried internally by the kiosk form factor housing. The method comprises operating a processor carried internally by the kiosk form factor housing to receive user input from a user, cause the card supply to pay out a given card to the printing device, cause the printing device to print a custom image on the first printable major surface of the given card based upon at least the user input, and dispense a customized magnet card to the user.

DETAILED DESCRIPTION

Figure 1:
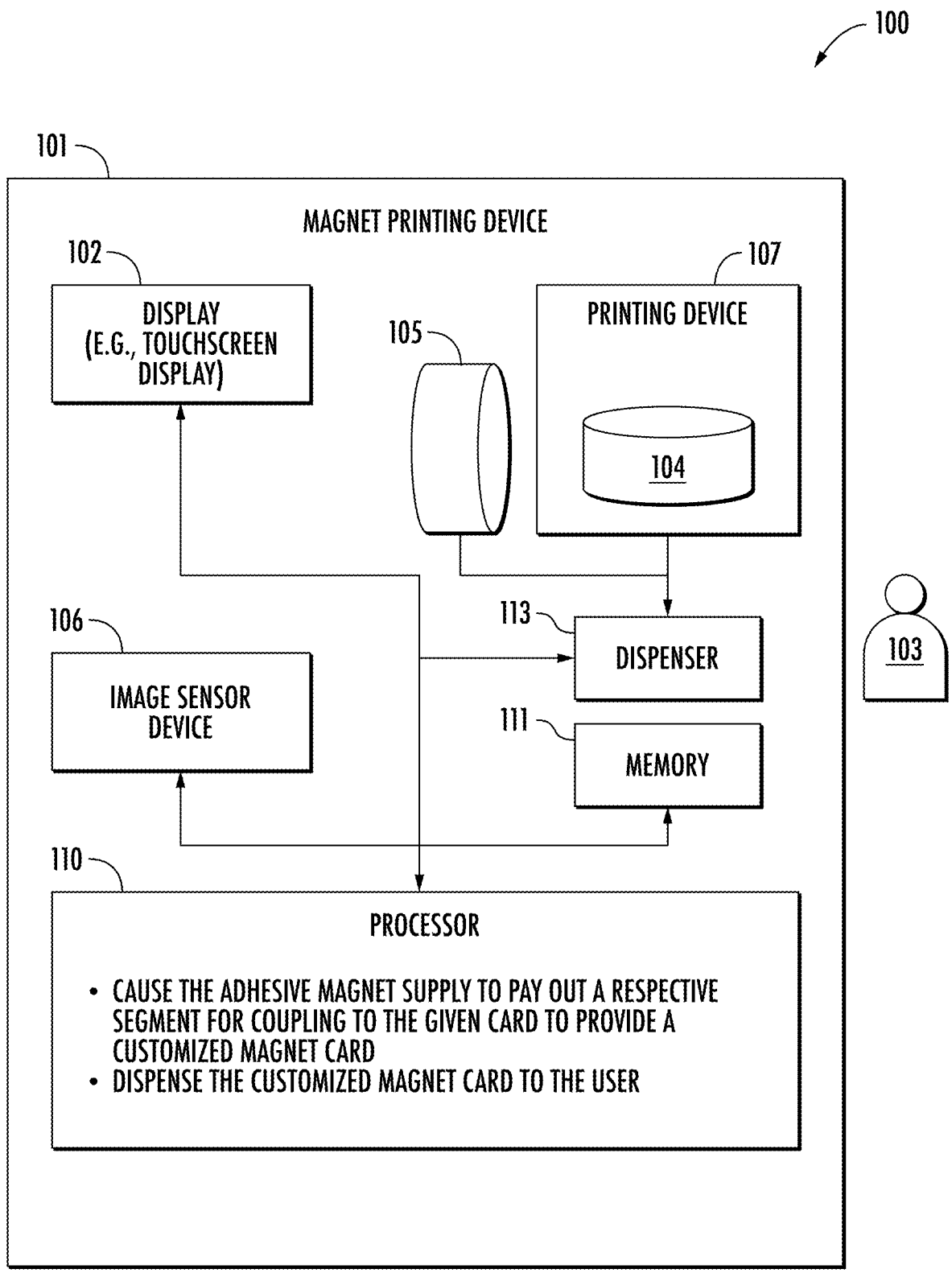
FIG. 1 is a schematic diagram of a magnet printing device, according to a first example embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 12:
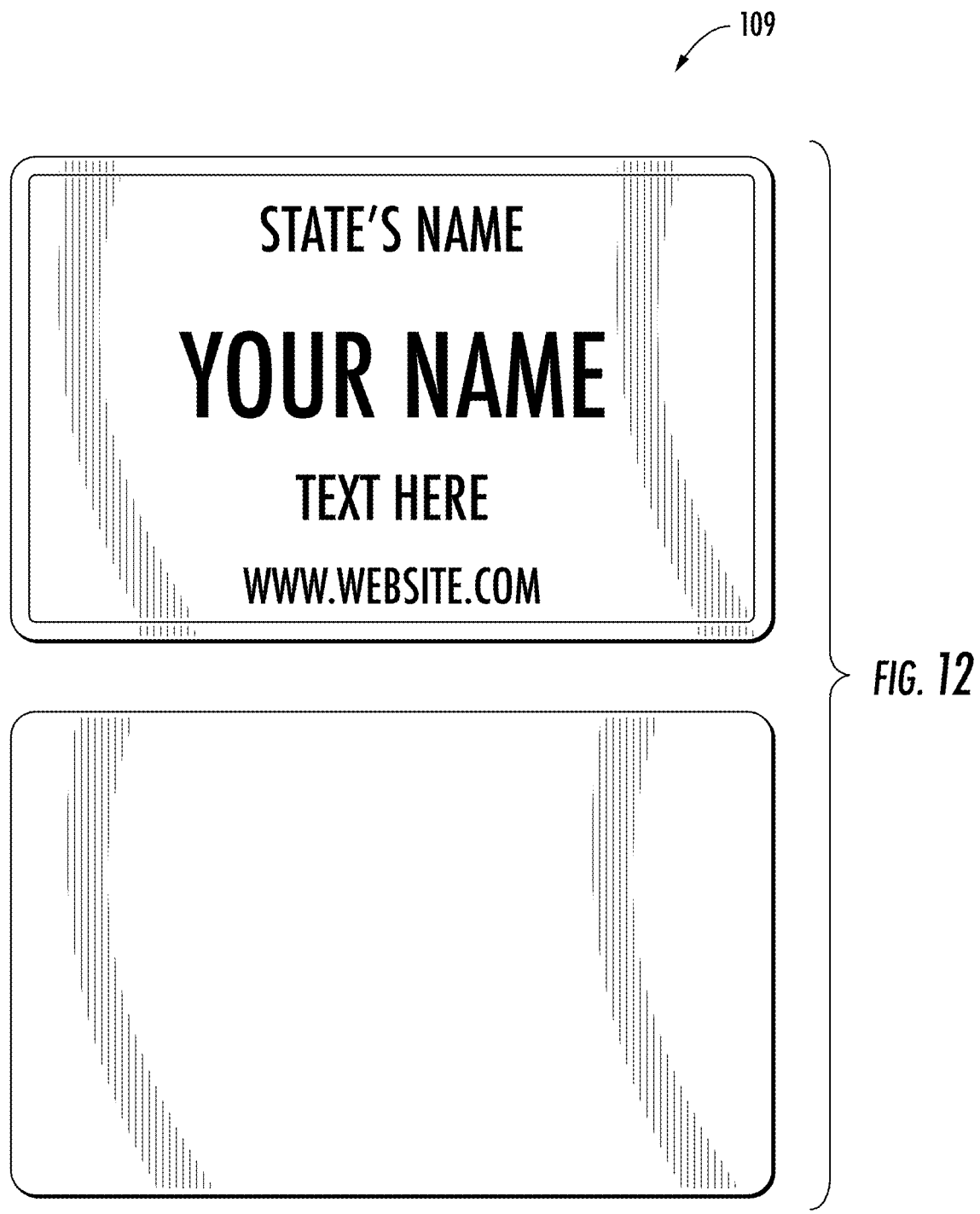
FIG. 12 is an image of an example card printed from the magnet printing device of FIG. 1.

Referring initially to FIGS. 1 & 12, a magnet printing device 100 according to the present disclosure is now described. The magnet printing device 100 includes a housing 101 (e.g., the kiosk form factor housing in FIGS. 3-4), and a touchscreen display 102 carried externally by the kiosk form factor housing and configured to receive user input from a user 103, and a card supply 104 carried by the housing. For example, the card supply 104 may comprise a store of a plurality of PVC CR80 cards (i.e., plastic rectangle shaped cards) in a variety of thickness 20, 30, 40, etc.

The magnet printing device 100 illustratively comprises an adhesive magnet supply 105 carried by the housing 101. For example, the adhesive magnet supply 105 may comprise a reel of adhesive magnetic strip tape. The magnet printing device 100 illustratively comprises an image sensor device 106 carried externally by the housing 101 and configured to generate image data. In some embodiments, the image sensor device 106 may comprise a 4k image web camera device.

The magnet printing device 100 illustratively comprises a printing device 107 carried by the housing 101 and configured to print a custom image on a given card 109 from the card supply 104 based upon the image data and/or the user input. In some embodiments, the printing device 107 comprises a Evolis KC Prime Card Printer, as available from Evolis of Beaucouzé, France, but may also comprise printers sourced from Zebra or Polaroid. Also, the card supply 104 may be integrated within the printing device 107 in some embodiments.

The magnet printing device 100 illustratively comprises a processor 110 and memory 111 cooperating therewith. The processor 110 is coupled to the touchscreen display 102, the image sensor device 106, and the printing device 107. The processor 110 is configured to generate a GUI 1000 for interacting with the user 103 to receive the user input.

The processor 110 is configured to cause the adhesive magnet supply 105 to pay out a respective segment for coupling to the given card to provide a customized magnet card, and dispense the customized magnet card to the user 103. For example, the processor 110 is configured to cause a mechanized cutting tool to cut the segment from the adhesive magnet supply 105 and apply the segment to the back of the given card.

Figure 2:
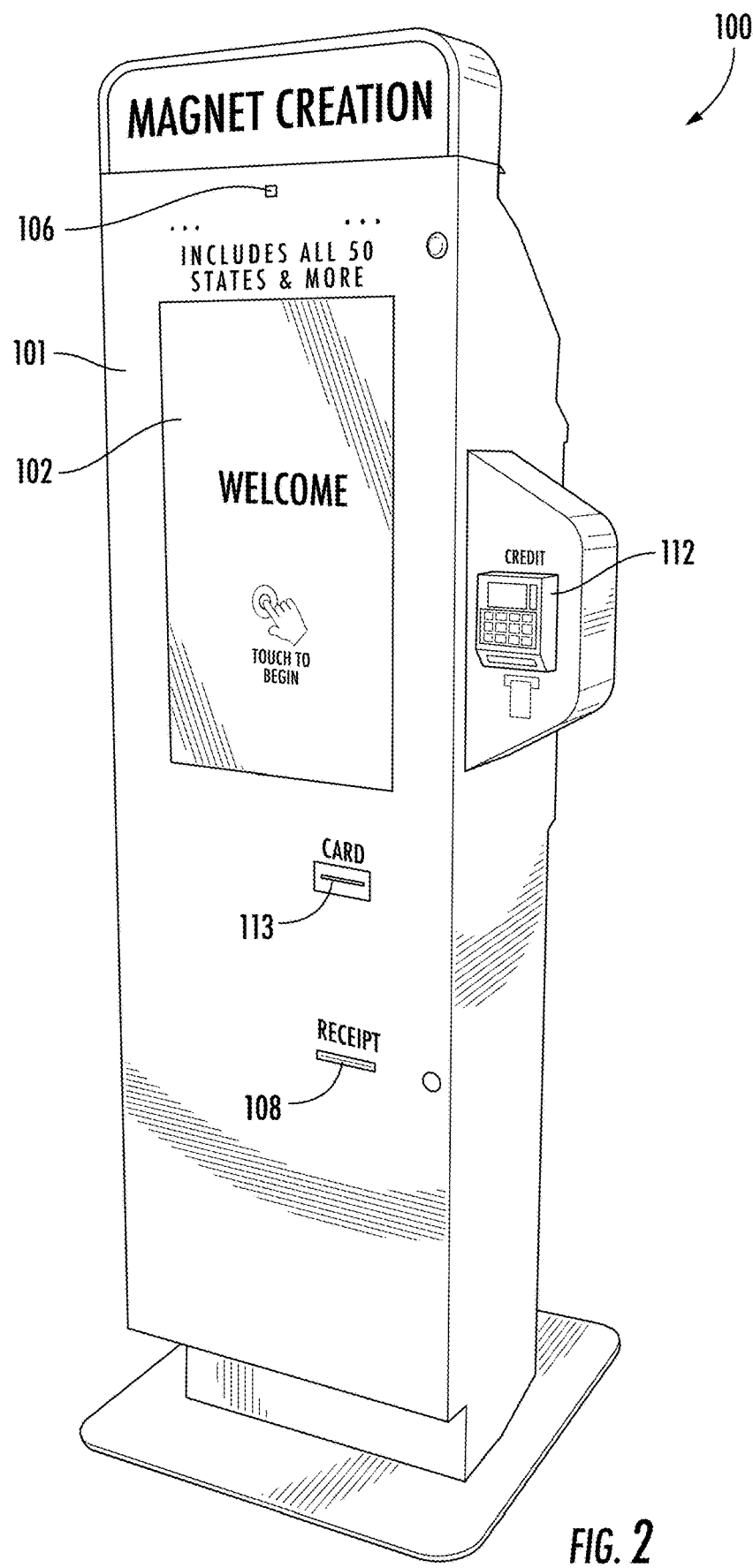
FIG. 2 is a detailed perspective view of the magnet printing device of FIG. 1.
Figure 3:
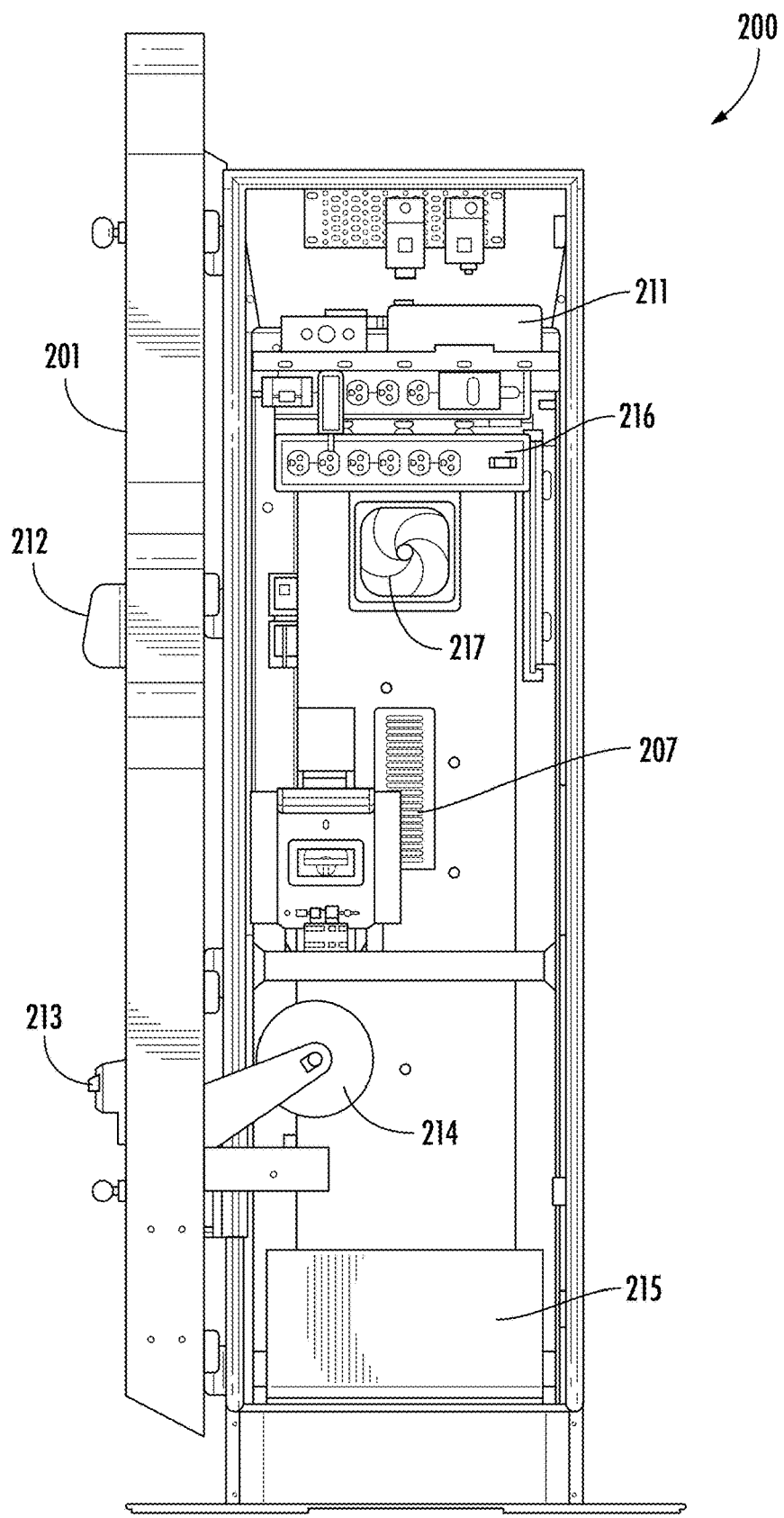
FIG. 3 is a front side view of a magnet printing device with the front panel swung open, according to a second example embodiment of the present disclosure.

Referring now additionally to FIG. 2, which shows a more detailed view of the magnet printing device 100, the magnet printing device 100 illustratively comprises a payment processing device 112 carried externally by the housing 101, a card dispensing slot 113 carried externally by the housing for permitting the given card 109 to pass therethrough, a receipt printer device (214: FIG. 3) carried internally within the housing and configured to print a payment receipt for a transaction with the user 103, and a receipt dispensing slot 108 carried externally by the housing for permitting the payment receipt to pass therethrough.

Another aspect is directed to a method for making a magnet printing device 100 in a housing 101. The method comprises positioning a touchscreen display 102 to be carried externally by the housing 101. The touchscreen display 102 is configured to receive user input from a user 103. The method comprises positioning a card supply 104 to be carried by the housing 101, positioning an adhesive magnet supply 105 to be carried by the housing, and positioning an image sensor device 106 to be carried externally by the housing. The image sensor device 106 is configured to generate image data. The method also includes positioning a printing device 107 to be carried by the housing 101. The printing device 107 is configured to print a custom image on a given card 109 from the card supply 104 based upon the image data and the user input, and coupling a processor 110 and a memory 111 cooperating therewith to the touchscreen display 102, the image sensor device 106, and the printing device 107. The method further includes configuring the processor 110 to cause the adhesive magnet supply 105 to pay out a respective segment for coupling to the given card to provide a customized magnet card, and dispense the customized magnet card to the user 103.

Figure 4:
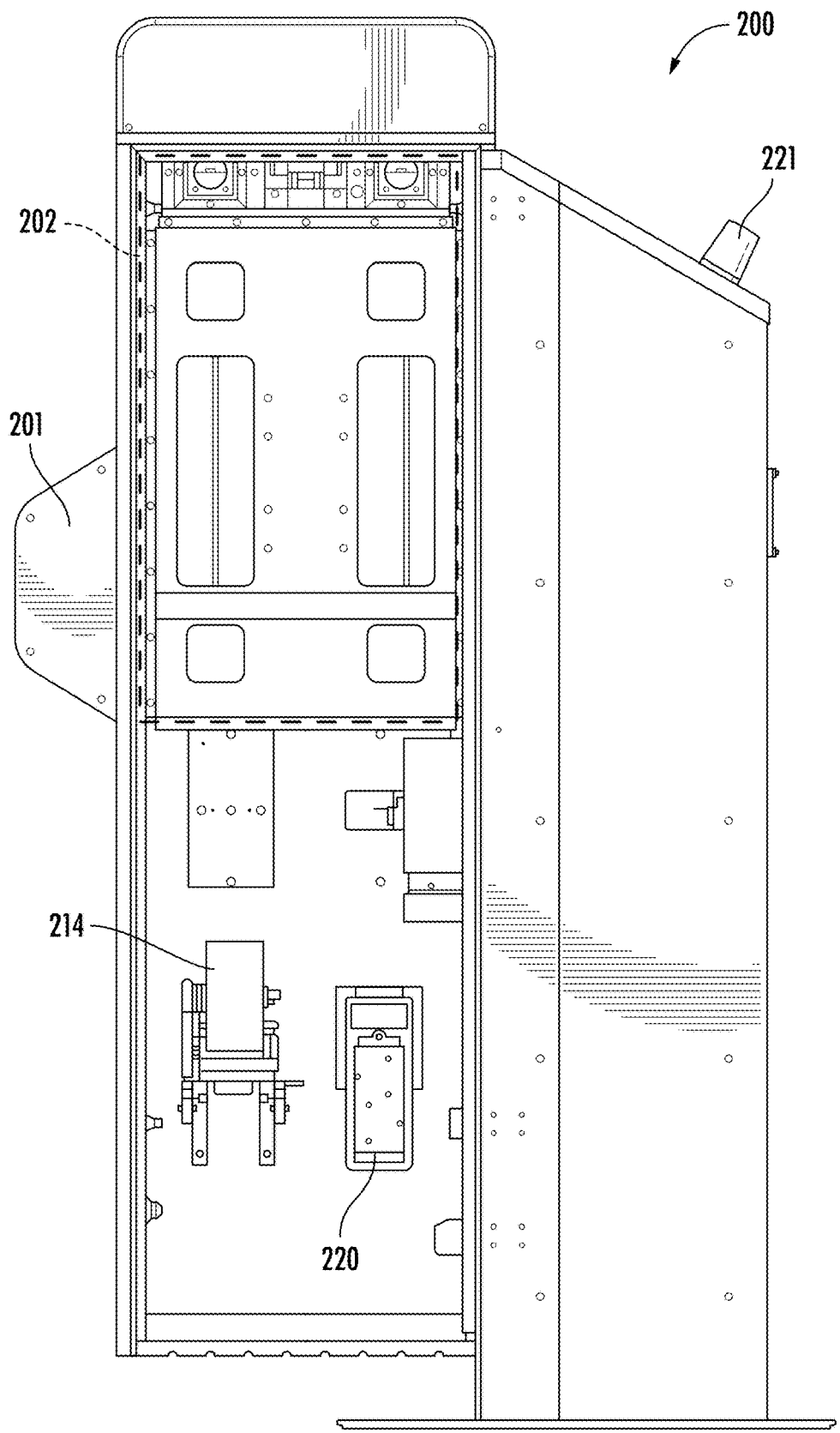
FIG. 4 is a side view of the magnet printing device of FIG. 3 with the front panel swung open.

Referring now additionally to FIGS. 3-4, another embodiment of the magnet printing device 200 is now described. In this embodiment of the magnet printing device 200, those elements already discussed above with respect to FIGS. 1-2 are incremented by 100 and most require no further discussion herein. This embodiment differs from the previous embodiment in that this magnet printing device 200 illustratively includes the housing 201 having a storage area 215 at a bottom end thereof, and a power supply strip 216 carried at an upper end thereof. The processor 210, the touchscreen display 202, the image sensor device 206, and the printing device 207 are all coupled to and powered by the power supply strip 216. The magnet printing device 200 illustratively includes a cooling fan 217 carried internally within the housing 201 to provide for thermal cooling within the housing. The magnet printing device 200 illustratively comprises a bill collector device 220 for receiving cash payment from the user 203, and a wireless transceiver 221 (e.g., WiFi transceiver) configured to provide a wireless connection to the Internet. In this embodiment, the processor 210 illustratively includes a personal computing device and associated USB hub for data connection to the touchscreen display 202, the image sensor device 206, and the printing device 207.

Figure 5:
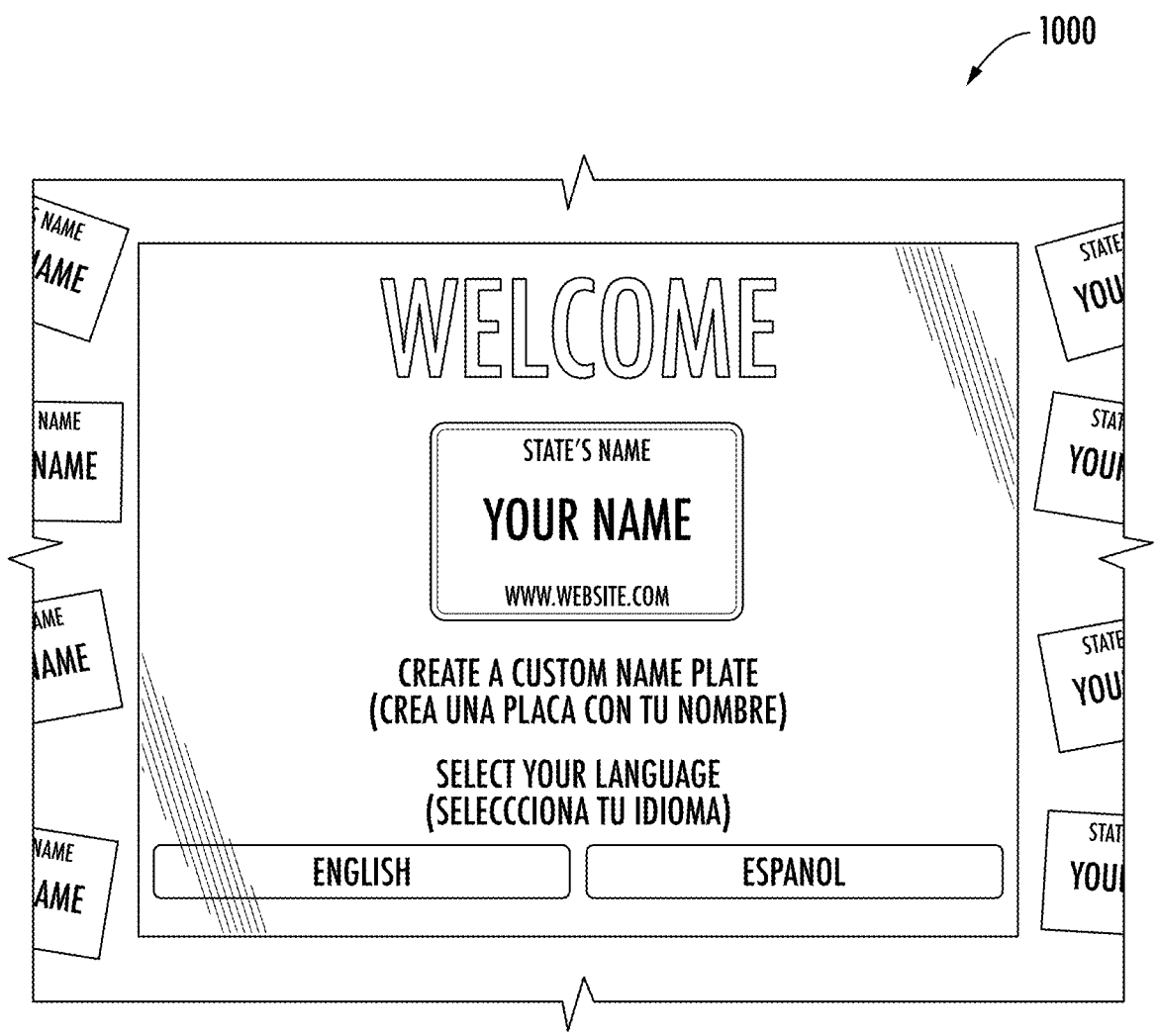
FIGS. 5-11 are screenshots from an example embodiment of a graphical user interface (GUI) from the magnet printing device of FIG. 1.
Figure 6:
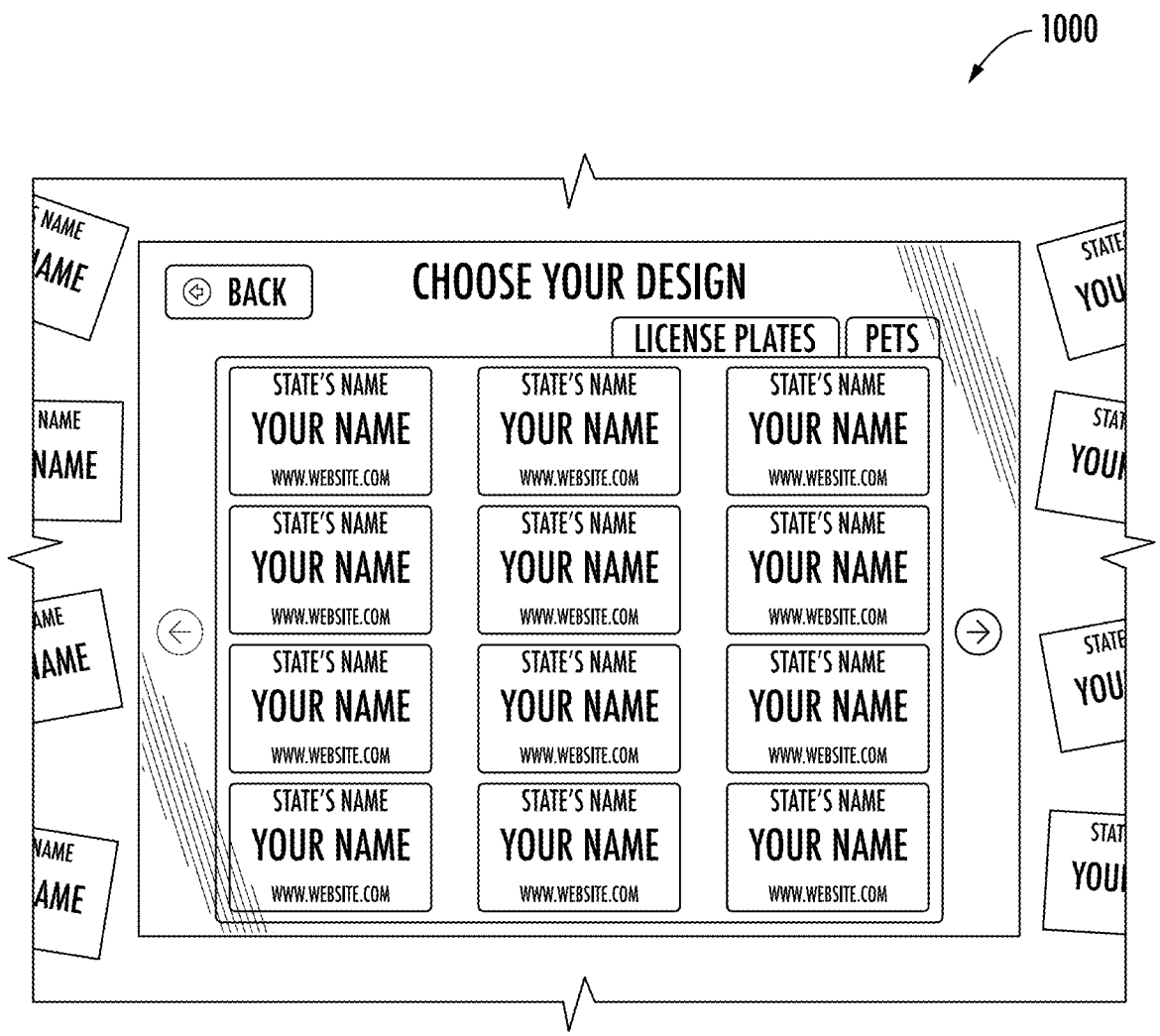
Figure 7:
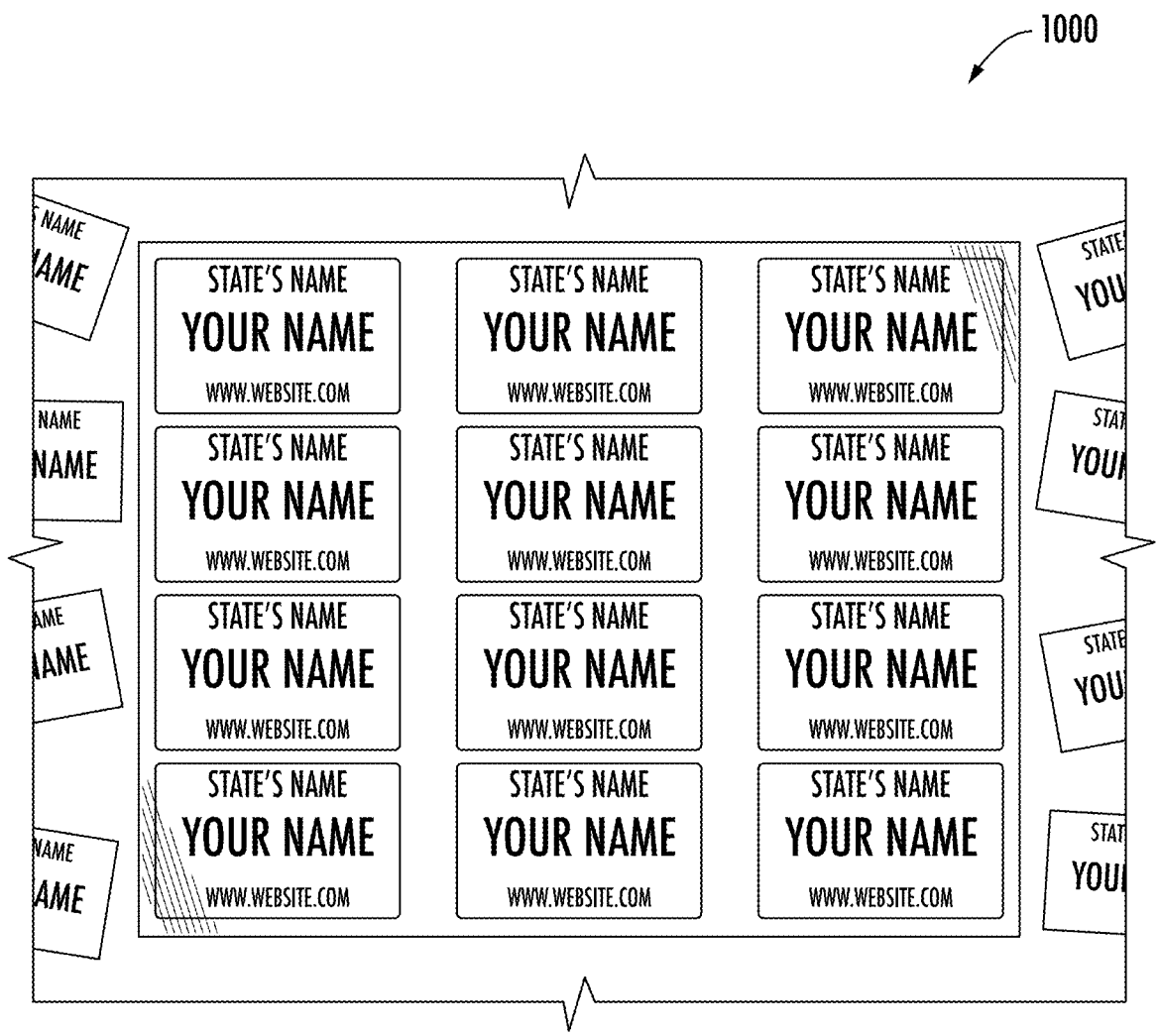
Figure 8:
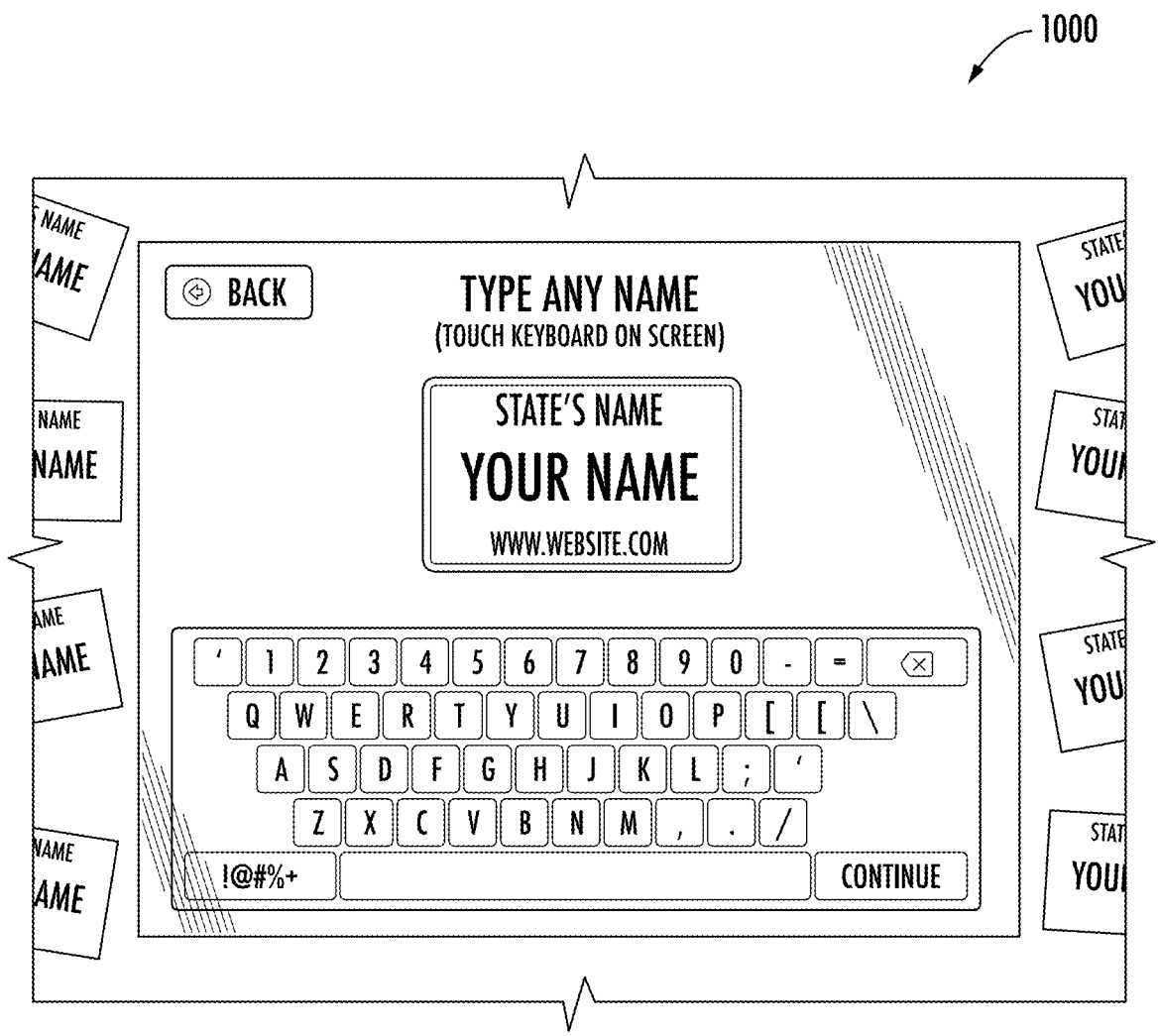
Figure 9:
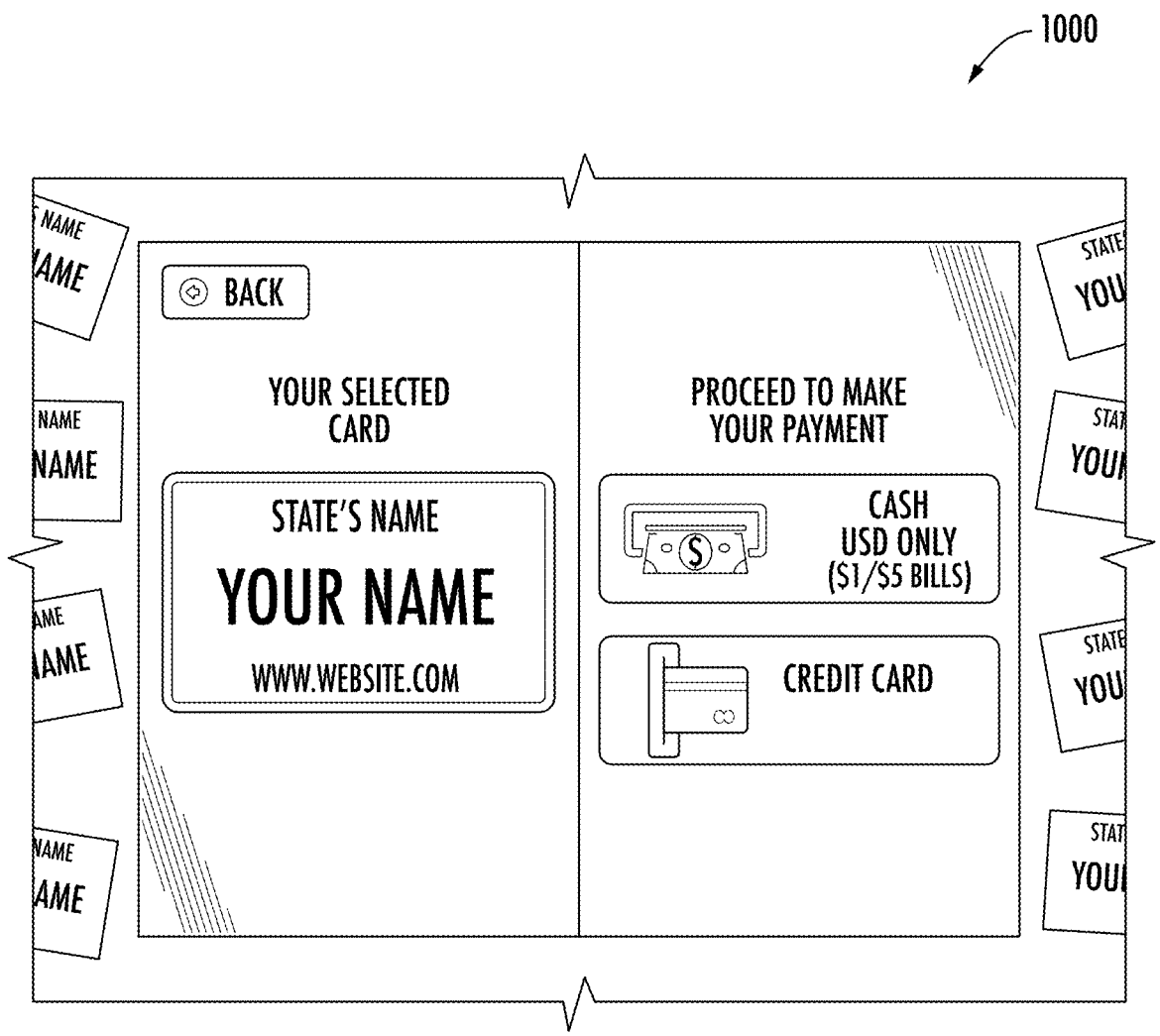
Figure 10:
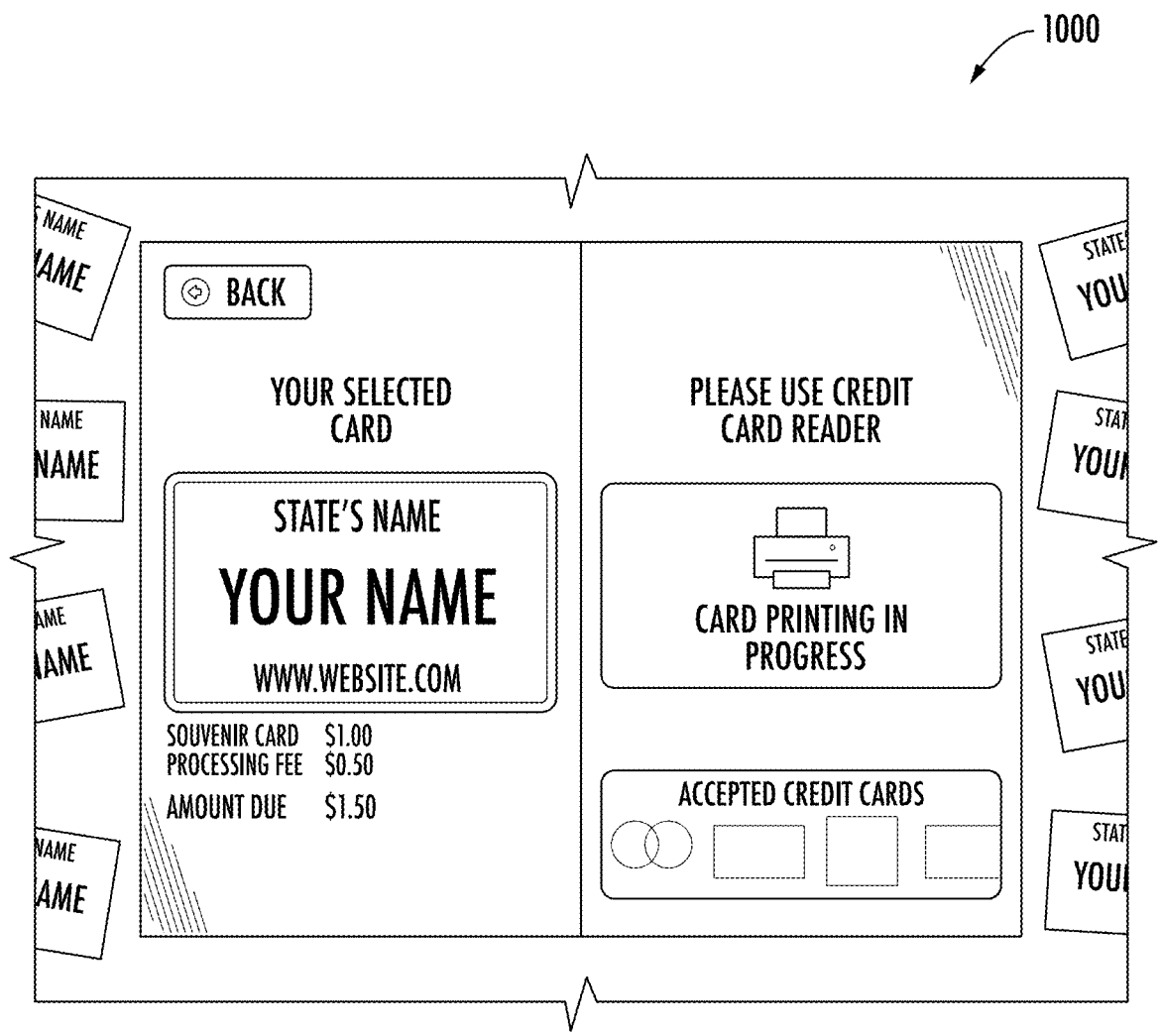
Figure 11:

Referring now to FIGS. 5-10, an example embodiment of the GUI 1000 for interacting with the user 103 is now described. In FIG. 5, the GUI 1000 illustratively includes a welcome GUI for beginning the magnet customization process. In FIGS. 6-7, the GUI 1000 illustratively includes a customization GUI for selecting a customized license plate image from a plurality of stored options (e.g., illustrated different state license plates, animal images, etc.) for the magnet customization process. Of course, using the image sensor device 106, the user 103 may create a customized background from a customized image from the image data. In FIG. 8, the GUI 1000 illustratively includes a keyboard GUI for permitting the user 103 to provide custom text for the magnet customization process. In FIGS. 9-10, the GUI 1000 illustratively includes a payment processing GUI for permitting the user 103 to review the proof version of the given card and submit payment for the magnet customization process in cooperation with the payment processing device 112. In FIG. 10, the GUI 1000 illustratively includes a print GUI for causing the processor 110 to coordinate with the printing device 107 to start preparation of the given card 109.

Figure 13:
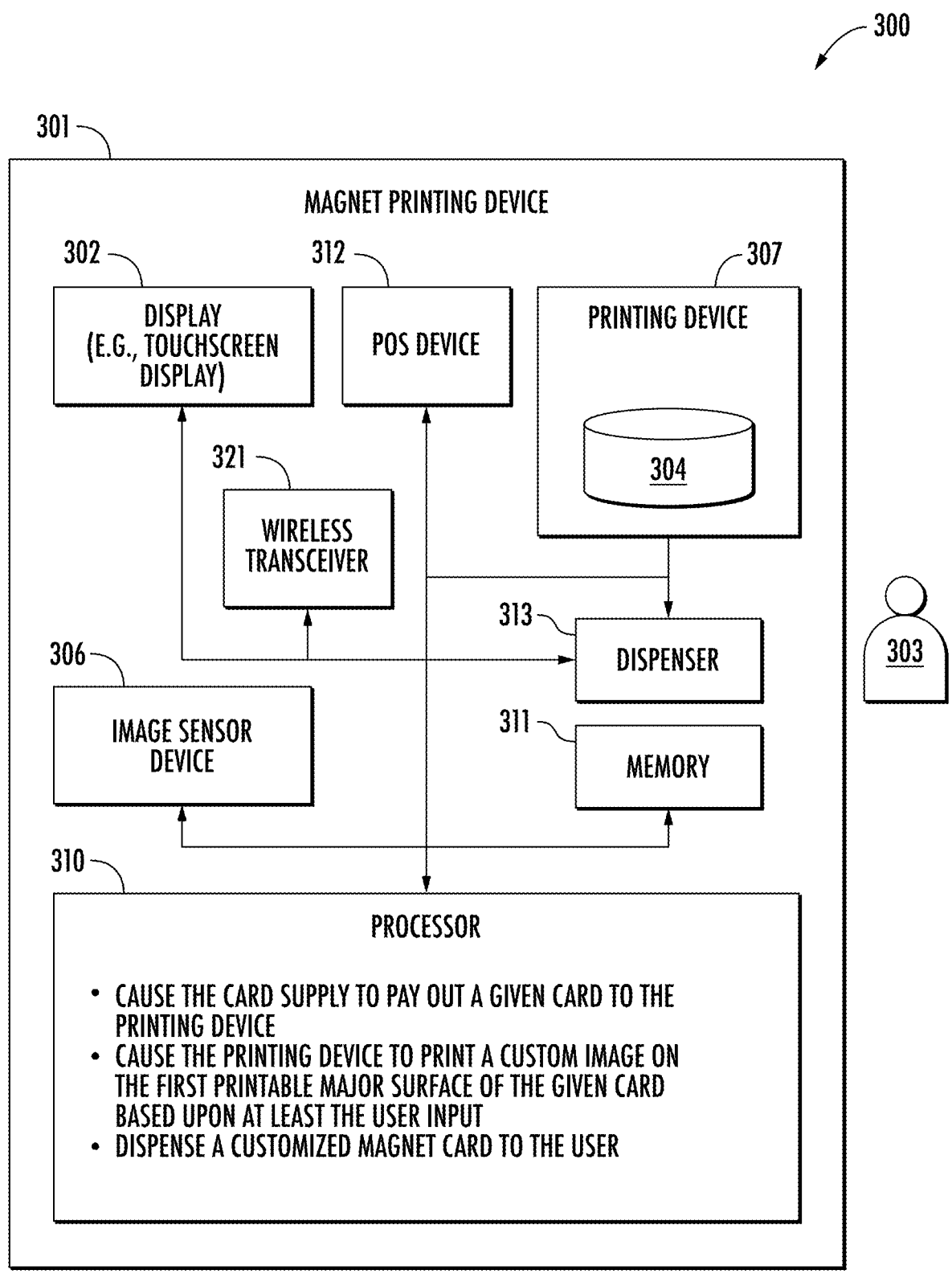
FIG. 13 is a schematic diagram of a magnet printing device, according to a third example embodiment of the present disclosure.
Figure 14:
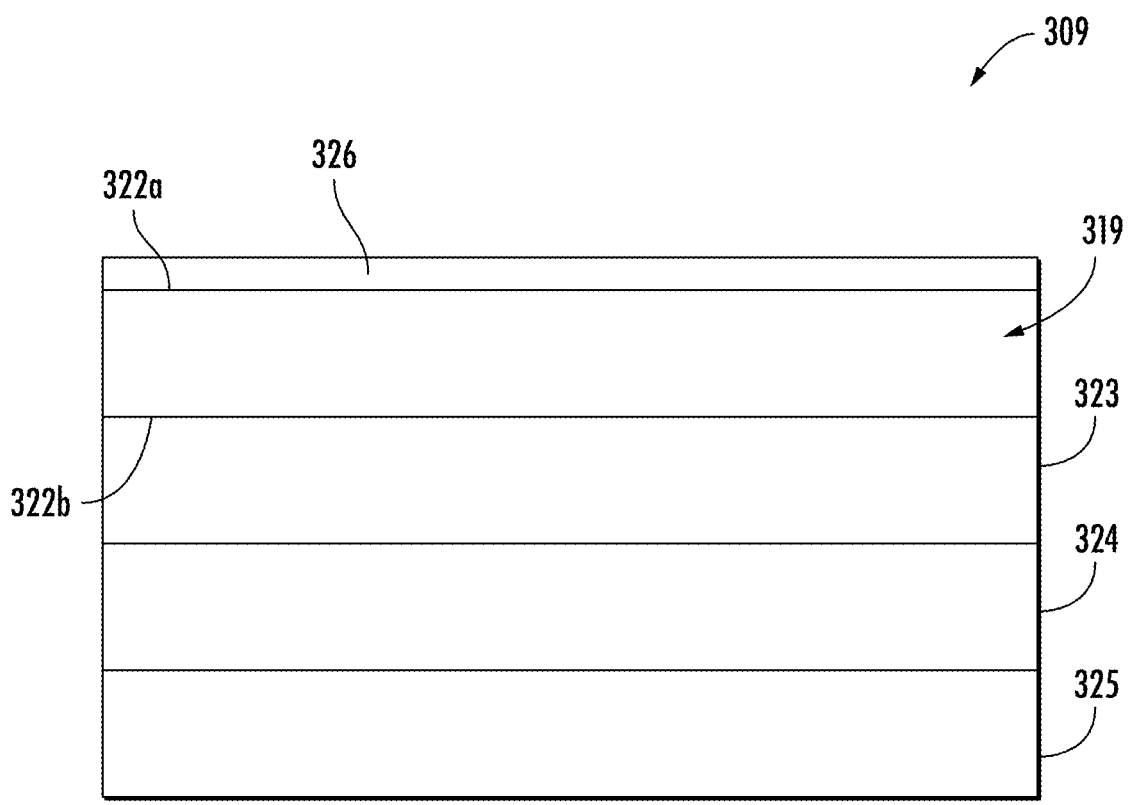
FIG. 14 is a side view of a card from the magnet printing device of FIG. 13.

Referring now additionally to FIGS. 13-14, another embodiment of the magnet printing device 300 is now described. In this embodiment of the magnet printing device 300, those elements already discussed above with respect to FIGS. 1-2 are incremented by 200 and most require no further discussion herein. This embodiment differs from the previous embodiment in that this magnet printing device 300 illustratively includes a kiosk form factor housing 301, a touchscreen display 302 carried externally by the kiosk form factor housing and configured to receive user input from a user 303, and a card supply 304 carried internally by the kiosk form factor housing. In some embodiments, the touchscreen display 302 may be replaced with a traditional output only display combined with a separate user input device.

The card supply 304 comprises a plurality of cards 309. Each card 309 comprises a polymer plastic substrate 319 having a first printable major surface 322a, and a second major surface 322b opposite to the first printable major surface. Each card 309 also comprises an adhesive layer 323 on the second major surface, a magnet layer 324 on the adhesive layer, and a coating layer 325 on the magnet layer. The coating layer 325 may comprise an epoxy coating layer, for example. In particular, the coating layer 325 may comprise a glossy finish with a reduced friction surface.

The magnet printing device 300 also includes a printing device 307 carried internally by the kiosk form factor housing 301, and a processor 310 and memory 311 cooperating therewith. The processor 310 and memory 311 are carried internally by the kiosk form factor housing 301 and coupled to the touchscreen display 302, the card supply 304, and the printing device 307. The processor 310 is configured to cause the card supply 304 to pay out a given card 309 to the printing device 307, cause the printing device to print a custom image 326 on the first printable major surface 322a of the given card based upon at least the user input, and dispense a customized magnet card to the user 303 via a dispenser slot 313 (e.g., a motorized card dispenser device).

In some embodiments (FIGS. 1-2), the magnet printing device 300 may also include an image sensor device carried externally by the kiosk form factor housing 301 and configured to generate image data. The processor 310 may be coupled to the image sensor device and may be configured to cause the printing device 307 to print the custom image 326 on the first printable major surface 322a of the given card 309 based upon at least the user input and the image data.

The magnet printing device 300 illustratively comprises a POS device 312 carried externally by the kiosk form factor housing 301 and coupled to the processor 310. The processor 310 is configured to receive payment from the user 303 via the POS device 312. The magnet printing device 300 also illustratively includes a wireless transceiver 321 carried by the kiosk form factor housing 301 and coupled to the processor 310. The processor 310 is configured to connect to an external network (e.g., the Internet) via the wireless transceiver 321.

For example, the magnet layer 324 may have a thickness less than 13 mils. In one embodiment, the magnet layer 324 comprises a magnetic layer with a thickness of approximately 12 mills (i.e., ±0.5 mills) and a pull force of approximately 0.24 lbs. (i.e., ±0.1 lbs.). The polymer plastic substrate 319 may comprise a polyvinyl chloride (PVC) substrate with a thickness of approximately 30 mills (i.e., ±5 mills), for instance. The polymer plastic substrate 319 may comprise a CR80 format card substrate in advantageous embodiments. The adhesive layer 323 may have a thickness of approximately 2 mills (i.e., ±0.5 mills). This may produce a card 309 of total thickness of 44 mills or less.

As will be appreciated, the magnet layer 324 is thinned so as to be readily processed by a commercial off the shelf (COTs) CR80 format card printing device. Further, the low friction glossy finish of the coating layer 325 may reduce the chance of jamming the printing device 307. Further, each card 309 may be subject to a cleansing bath of isopropyl alcohol to remove debris and contaminants from jamming the printing device 307. Helpfully, the magnet printing device 300 may be manufactured at reduced cost due to the ability to process the cards 309 using COTs equipment. Further, via the thinned magnet layer 324, the coating layer 325, and the cleaning pre-processing, COTs printing devices can process the cards 309 without jamming.

Another aspect is directed to a method for operating a magnet printing device 300. The magnet printing device 300 comprises a kiosk form factor housing 301, a touchscreen display 302 carried externally by the kiosk form factor housing, and a card supply 304 carried internally by the kiosk form factor housing. The card supply 304 comprises a plurality of cards 309. Each card 309 comprises a polymer plastic substrate 319 having a first printable major surface 322a, and a second major surface 322b opposite to the first printable major surface, an adhesive layer 323 on the second major surface, and a magnet layer 324 on the adhesive layer. The magnet printing device 300 also includes a printing device 307 carried internally by the kiosk form factor housing 301. The method comprises operating a processor 310 carried internally by the kiosk form factor housing 301 to receive user input from a user 303, cause the card supply 304 to pay out a given card 309 to the printing device 307, cause the printing device to print a custom image 326 on the first printable major surface 322a of the given card based upon at least the user input, and dispense a customized magnet card to the user.

As will be appreciated by the skilled person, the features of each of the magnetic printing devices 100, 200, 300 may be combined with each other.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A magnet printing device comprising:
   a kiosk form factor housing;
   a touchscreen display carried externally by the kiosk form factor housing and configured to receive user input from a user;
   a card supply carried internally by the kiosk form factor housing, the card supply comprising a plurality of cards, each card comprising
      a polymer plastic substrate having a first printable major surface, and a second major surface opposite to the first printable major surface, the polymer plastic substrate comprising a CR80 format card substrate,
      an adhesive layer on the second major surface and having a thickness of approximately 2 mils,
      a magnet layer on the adhesive layer and having a thickness less than 13 mils, and
      a reduced friction epoxy coating layer on the magnet layer;
   a CR80 format card printing device carried internally by the kiosk form factor housing; and
   a processor and memory cooperating therewith, the processor and memory carried internally by the kiosk form factor housing and coupled to the touchscreen display, the card supply, and the CR80 format card printing device, the processor configured to
      cause the card supply to pay out a given card to the CR80 format card printing device,
      cause the CR80 format card printing device to print a custom image on the first printable major surface of the given card based upon at least the user input, and
      dispense a customized magnet card to the user.

2. The magnet printing device of claim 1 further comprising an image sensor device carried externally by the kiosk form factor housing and configured to generate image data; and wherein the processor is coupled to the image sensor device and is configured to cause the CR80 format card printing device to print the custom image on the first printable major surface of the given card based upon at least the user input and the image data.

3. The magnet printing device of claim 1 further comprising a point-of-sale (POS) device carried externally by the kiosk form factor housing and coupled to the processor, the processor configured to receive payment from the user via the POS device.

4. The magnet printing device of claim 1 further comprising a wireless transceiver carried by the kiosk form factor housing and coupled to the processor, the processor configured to connect to an external network via the wireless transceiver.

5. The magnet printing device of claim 1 wherein the polymer plastic substrate comprises a polyvinyl chloride (PVC) substrate.

6. A method for operating a magnet printing device comprising a kiosk form factor housing, a touchscreen display carried externally by the kiosk form factor housing, a card supply carried internally by the kiosk form factor housing, the card supply comprising a plurality of cards, each card comprising a polymer plastic substrate having a first printable major surface, the polymer plastic substrate comprising a CR80 format card substrate, and a second major surface opposite to the first printable major surface, an adhesive layer on the second major surface and having a thickness of approximately 2 mils, a magnet layer on the adhesive layer and having a thickness less than 13 mils, and a reduced friction epoxy coating layer on the magnet layer, a CR80 format card printing device carried internally by the kiosk form factor housing, the method comprising:
 operating a processor carried internally by the kiosk form factor housing to
  receive user input from a user,
  cause the card supply to pay out a given card to the CR80 format card printing device,
  cause the CR80 format card printing device to print a custom image on the first printable major surface of the given card based upon at least the user input, and
  dispense a customized magnet card to the user.

7. The method of claim 6 further comprising operating a processor to cause the CR80 format card printing device to print the custom image on the first printable major surface of the given card based upon at least the user input and image data from an image sensor device.

8. The method of claim 6 wherein the polymer plastic substrate comprises a polyvinyl chloride (PVC) substrate.

9. A magnet printing device comprising:
 a kiosk form factor housing;
 a touchscreen display carried externally by the kiosk form factor housing and configured to receive user input from a user;
 a card supply carried internally by the kiosk form factor housing, the card supply comprising a plurality of cards, each card comprising
  a polymer plastic substrate having a first printable major surface, and a second major surface opposite to the first printable major surface, the polymer plastic substrate comprising a CR80 format card substrate,
  an adhesive layer on the second major surface and having a thickness of approximately 2 mils,
  a magnet layer on the adhesive layer and having a thickness less than 13 mils, and
  a reduced friction epoxy coating layer on the magnet layer;
 a CR80 format card printing device carried internally by the kiosk form factor housing;
 a point-of-sale (POS) device carried externally by the kiosk form factor housing;
 a wireless transceiver carried by the kiosk form factor housing; and
 a processor and memory cooperating therewith, the processor and memory carried internally by the kiosk form factor housing and coupled to the touchscreen display, the card supply, the CR80 format card printing device, the POS device, and the wireless transceiver, the processor configured to
  connect to an external network via the wireless transceiver,
  receive payment from the user via the POS device,
  cause the card supply to pay out a given card to the CR80 format card printing device,
  cause the CR80 format card printing device to print a custom image on the first printable major surface of the given card based upon at least the user input, and
  dispense a customized magnet card to the user.

\* \* \* \* \*